(12) United States Patent
Moon et al.

(10) Patent No.: US 7,403,502 B2
(45) Date of Patent: Jul. 22, 2008

(54) NOTIFICATION EQUIPMENT, TERMINAL EQUIPMENT, COMMUNICATION SYSTEM AND COMMUNICATION METHOD

(75) Inventors: Sung Uk Moon, Yokohama (JP); Minami Ishii, Yokohama (JP); Takehiro Nakamura, Yokosuka (JP)

(73) Assignee: NTT DoCoMo. Inc., Tokyo (JP)

( * ) Notice: Subject to any disclaimer, the term of this patent is extended or adjusted under 35 U.S.C. 154(b) by 88 days.

(21) Appl. No.: 11/199,088

(22) Filed: Aug. 9, 2005

(65) Prior Publication Data

US 2006/0034214 A1 Feb. 16, 2006

(30) Foreign Application Priority Data

Aug. 10, 2004 (JP) .............. P2004-233890

(51) Int. Cl.
*H04Q 7/00* (2006.01)
(52) U.S. Cl. .............. 370/328; 370/471; 370/468; 455/412.2
(58) Field of Classification Search .............. 370/437, 370/233, 444, 342, 428, 335, 508, 345; 455/450, 455/452.2, 414.1; 709/229
See application file for complete search history.

(56) References Cited

U.S. PATENT DOCUMENTS

| 5,694,438 | A  | * | 12/1997 | Wang et al. ............... | 375/347 |
| 6,130,915 | A  | * | 10/2000 | Hallier et al. ............. | 375/260 |
| 6,721,338 | B1 | * | 4/2004  | Sato ........................ | 370/508 |
| 6,977,945 | B1 | * | 12/2005 | Noda et al. ............... | 370/468 |
| 7,065,068 | B2 | * | 6/2006  | Ghosh et al. ............. | 370/342 |
| 2002/0088007 | A1 | * | 7/2002 | Shimoji et al. ........... | 725/135 |
| 2003/0217168 | A1 | * | 11/2003 | Adachi et al. ............. | 709/229 |
| 2005/0195852 | A1 | * | 9/2005  | Vayanos et al. .......... | 370/437 |

FOREIGN PATENT DOCUMENTS

| CN | 1335002 A | 2/2002 |
| JP | 63-61520 | 3/1988 |
| WO | WO 00/45543 | 8/2000 |
| WO | WO 2005/067180 A1 | 7/2005 |
| WO | WO 2005/079105 A1 | 8/2005 |

OTHER PUBLICATIONS

"Universal Mobile Telecommunications System (UMTS); Introduction of Multimedia Broadcast/Multicast Service (MBMS) in the Radio Access Network (RAN); Stage 2 (3GPP TS 25.346 version 6.1.0 Release 6); ETSI TS 125 346", XP-014016838, Jun. 2004, pp. 1-52.

"3rd Generation Partnership Project; Technical Specification Group Radio Access Network; Introduction of the MultiMedia Broadcast Multicast Service (MBMS)in the Radio Access Network (RAN)", Stage 2 (Release 6), 3GPP TS 25.346 V6.0.0 Mar. 2004, pp. 1-50.

* cited by examiner

*Primary Examiner*—Tan Trinh
(74) *Attorney, Agent, or Firm*—Oblon, Spivak, McClelland, Maier & Neustadt, P.C.

(57) ABSTRACT

A notification equipment comprises a transmission data determination unit configured to determine whether transmission data to be transmitted to a terminal equipment is first transmission data or repeated transmission data, an instruction data generator configured to generate identification instruction data indicating that the transmission data is the first transmission data or the repeated transmission data based on a transmission data determination result by the transmission data determination unit, and an instruction data transmitter configured to transmit the identification instruction data to the terminal equipment.

8 Claims, 9 Drawing Sheets

NOTIFICATION EQUIPMENT, TERMINAL EQUIPMENT, COMMUNICATION SYSTEM AND COMMUNICATION METHOD

CROSS REFERENCE TO RELATED APPLICATIONS

This application is based upon and claims the benefit of priority from prior Japanese Patent Application No. 2004-233890, filed on Aug. 10, 2004; the entire contents of which are incorporated herein by reference.

BACKGROUND OF THE INVENTION

1. Field of the Invention

The present invention relates to a notification equipment, a terminal equipment, a communication system, and a communication method.

2. Description of the Related Art

Services for broadcasting or multicasting multimedia contents to multiple mobile stations (Multimedia Broadcast Multicast Service, hereafter referred to as 'MBMS') have been conventionally carried out (see 3GPP TSG-RAN, "TS25.346 V6.0.0 Introduction of Multimedia Broadcast Multicast Service (MBMS) in Radio Access Network (RAN)", March 2004.)

A mobile station first receives an instruction channel for transmitting instruction data instructing to receive a control channel for transmitting control data, which is necessary for receiving a data channel for transmitting multimedia contents. The mobile station confirms the instruction data on the instruction channel when it is interested in the MBMS and then receives the necessary control channel. The mobile station then receives the data channel using the control data obtained from the control channel. The same control data is repeatedly transmitted on the control channel.

However, with the conventional method, the mobile station is not able to discern whether the control data transmitted on the control channel is data first transmitted or data repeatedly transmitted. Therefore, the mobile station may receive the control data a number of times. A terminal equipment such as the mobile station is not capable of properly receiving only necessary transmission data such as control data in this manner. As a result, this has led to faster draining of a battery in the terminal equipment and increase in control load of the terminal equipment due to reception of useless transmission data.

SUMMARY OF THE INVENTION

An object of the present invention is to provide a terminal equipment capable of properly receiving necessary transmission data.

A notification equipment according to an embodiment of the present invention comprises a transmission data determination unit configured to determine whether transmission data to be transmitted to a terminal equipment is first transmission data or repeated transmission data, an instruction data generator configured to generate identification instruction data indicating that the transmission data is the first transmission data or the repeated transmission data based on a transmission data determination result by the transmission data determination unit, and an instruction data transmitter configured to transmit the identification instruction data to the terminal equipment. The 'transmission data determination result' refers to a result of determining whether the transmission data is first transmission data or repeated transmission data when generating identification instruction data.

The notification equipment is capable of determining whether transmission data is first transmission data, which is to be transmitted for the first time, or repeated transmission data, which has already been transmitted once and will be further repeatedly transmitted, and then generating identification instruction data indicating that the transmission data is first transmission data or repeated transmission data. The notification equipment can transmit the identification instruction data to the terminal equipment, so as to notify the terminal equipment that the transmission data is first transmission data or repeated transmission data. Accordingly, the notification equipment can make the terminal equipment properly receive only the necessary transmission data.

A terminal equipment according to an embodiment of the present invention comprises an instruction data receiver configured to receive identification instruction data indicating that transmission data is first transmission data or repeated transmission data, an instruction data determination unit configured to determine whether the transmission data is the first transmission data or the repeated transmission data based on the identification instruction data, a reception determination unit configured to determine whether or not to receive the transmission data based on an instruction data determination result by the instruction data determination unit, and a transmission data receiver configured to receive the transmission data based on a reception determination result by the reception determination unit. The 'instruction data determination result' refers to a result of determining whether transmission data is first transmission data or repeated transmission data based on the identification instruction data. The 'reception determination result' refers to a result of determining whether or not to receive transmission data.

The terminal equipment is capable of receiving the identification instruction data and then determining whether transmission data is first transmission data, which is to be transmitted for the first time, or repeated transmission data, which has already been transmitted once and will be further repeatedly transmitted. The terminal equipment can determine whether or not to receive the transmission data based on the instruction data determination result and then receive the transmission data. Accordingly, the terminal equipment can properly receive only the necessary transmission data.

A communication system according to an embodiment of the present invention comprises a notification equipment configured to determine whether transmission data to be transmitted to a terminal equipment is first transmission data or repeated transmission data, generate identification instruction data indicating that the transmission data is the first transmission data or the repeated transmission data based on a transmission data determination result, and transmit the identification instruction data to the terminal equipment, and the terminal equipment configured to receive the identification instruction data, determine whether the transmission data is the first transmission data or the repeated transmission data based on the identification instruction data, determine whether or not to receive the transmission data based on an instruction data determination result, and receive the transmission data based on a reception determination result.

A communication method for notifying identification instruction data, according to an embodiment of the present invention, comprises determining whether transmission data to be transmitted to a terminal equipment is first transmission data or repeated transmission data, generating identification instruction data indicating that the transmission data is the first transmission data or the repeated transmission data based on a transmission data determination result, and transmitting the identification instruction data to the terminal equipment.

A communication method for receiving transmission data, according to an embodiment of the present invention, comprises receiving identification instruction data indicating that transmission data is first transmission data or repeated transmission data, determining whether the transmission data is the first transmission data or the repeated transmission data based on the identification instruction data, determining whether or not to receive the transmission data based on an instruction data determination result, and receiving the transmission data based on a reception determination result.

DETAILED DESCRIPTION OF THE EMBODIMENTS (Mobile Communication System)

Figure 1:
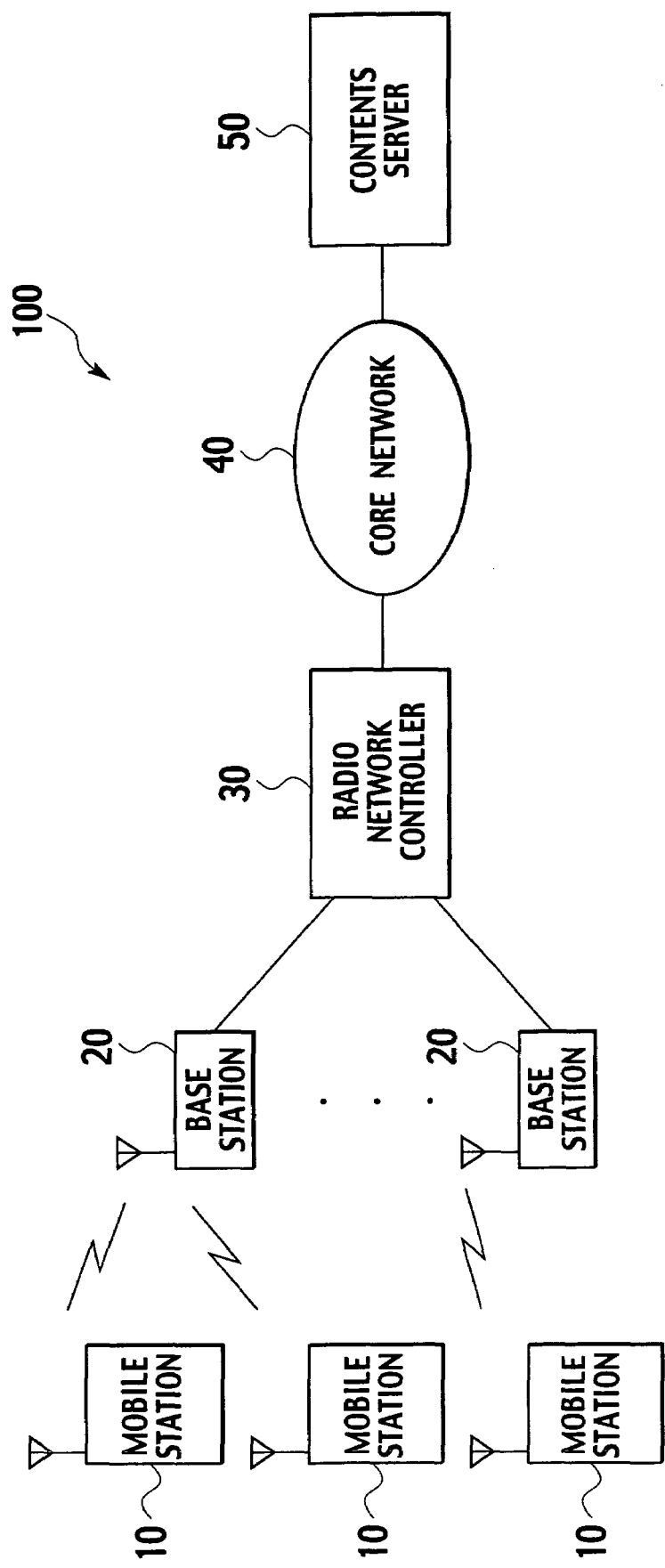
FIG. 1 is a diagram showing a communication system according to an embodiment of the present invention.

As shown in FIG. 1, a mobile communication system 100 comprises mobile stations 10, base stations 20, a radio network controller 30, a core network 40, and a contents server 50. The mobile communication system 100 carries out multimedia broadcast multicast service (MBMS) of broadcasting or multicasting multimedia contents or the like to multiple mobile stations 10.

The contents server 50 broadcasts or multicasts multimedia contents or the like to multiple mobile stations 10 via the core network 40, the radio network controller 30, and the base stations 20. The radio network controller 30 controls radio communication among the base stations 20 and the mobile stations 10. The base stations 20 transmit/receive data to/from the mobile stations 10 using radio channels under control by the radio network controller 30. The mobile stations 10 transmit/receive data to/from the base stations 20 using radio channels. The mobile stations 10 transmit/receive data to/from the radio network controller 30, the contents server 50, and a communication equipment in the core network 40 via the base stations 20.

Figure 2:
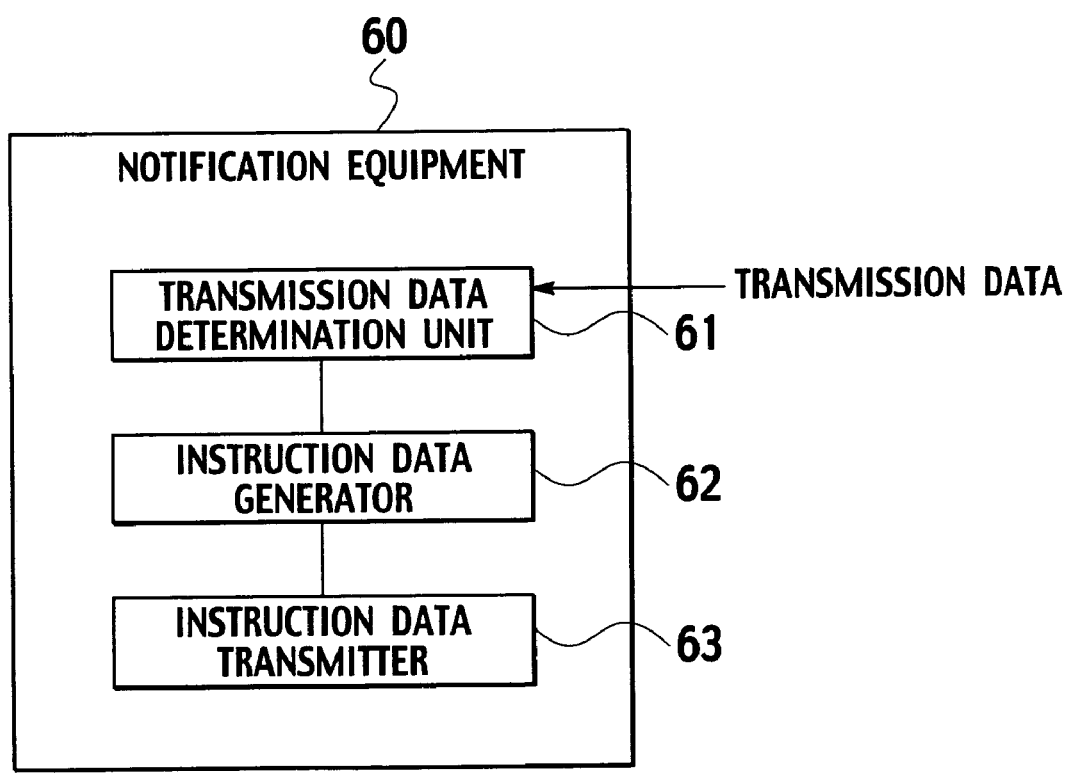
FIG. 2 is a block diagram showing a notification equipment according to the embodiment of the present invention.

A notification equipment 60 shown in FIG. 2 is provided in the mobile communication system 100. The notification equipment 60 notifies that transmission data to be transmitted to a terminal equipment such as a mobile station 10 or the like is first transmission data or repeated transmission data. The place for providing the notification equipment 60 is not limited. The notification equipment 60 may be provided in the contents server 50, the core network 40, the radio network controller 30, or the base stations 20.

To begin with, radio channels used for MBMS carried out in the mobile communication system 100 are described. Radio channels used for MBMS include an MBMS traffic channel (MTCH), an MBMS control channel (MCCH), and an MBMS paging indicator channel (MICH).

The MTCH is a data channel for transmitting multicast contents through MBMS. The MCCH is a control channel for transmitting necessary control data for receiving the MTCH. The MICH is an instruction channel for transmitting instruction data regarding broadcast or multicast. A notification indicator (hereafter referred to as 'NI') as the instruction data is transmitted on the MICH. The NI can instruct to receive the MCCH. For example, the NI being on indicates that reception is necessary, and the NI being off indicates that reception is unnecessary. The NI is mapped on the MICH according to MBMS and then transmitted.

A mobile station 10, which is interested in an MBMS, first receives the MICH and then confirms the NI. The mobile station 10 receives the MCCH when the NI is on. The mobile station 10 then receives the MTCH according to the control data received through the MCCH. In this manner, the mobile station 10 can determine whether or not the MBMS, which is of interest to the mobile station 10, is provided through reception of the MICH and the MCCH. Accordingly, the mobile station 10 does not have to uselessly receive and monitor the MTCH when it does not want to receive multimedia contents. Therefore, draining of a battery in the mobile station 10 can be prevented.

Figure 3:
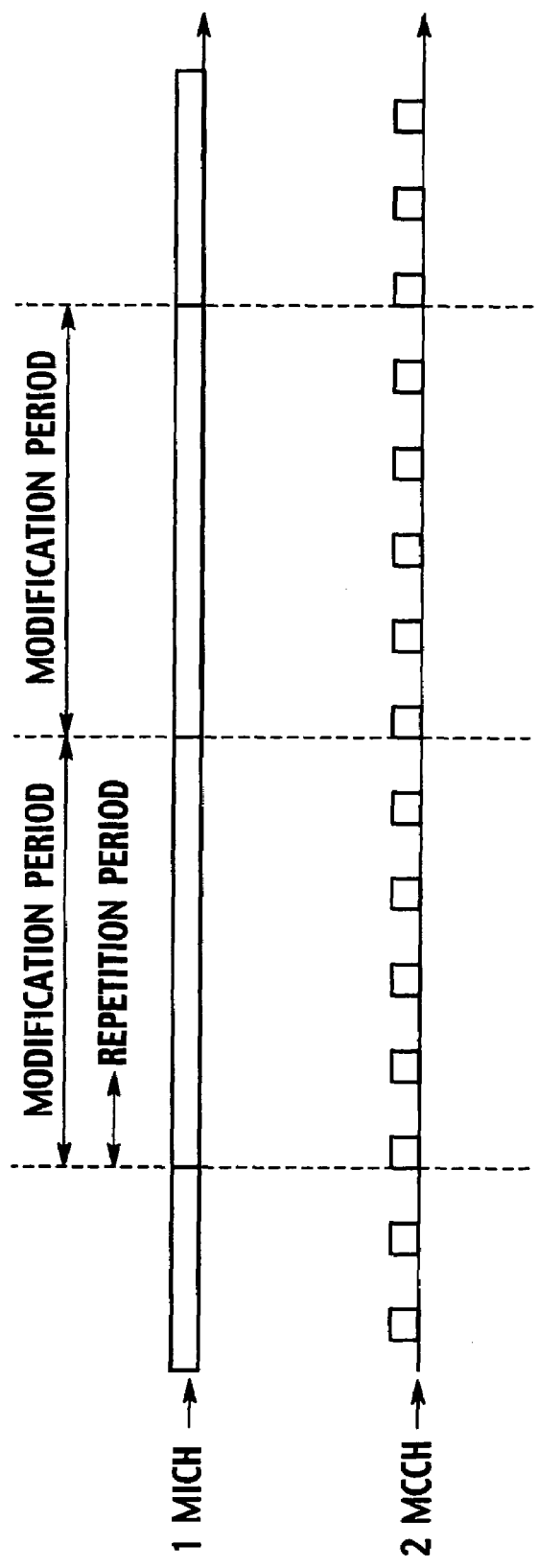
FIG. 3 is a diagram showing an MICH and an MCCH according to the embodiment of the present invention.

As shown in FIG. 3, control data to be transmitted through MCCH 2 is transmitted once every period called a repetition period. The control data to be transmitted through the MCCH 2 is not changed during a period called a modification period. In other words, the same control data is repeatedly transmitted as transmission data several times. As a result, the mobile station 10 can receive the control data without fail.

Figure 4:
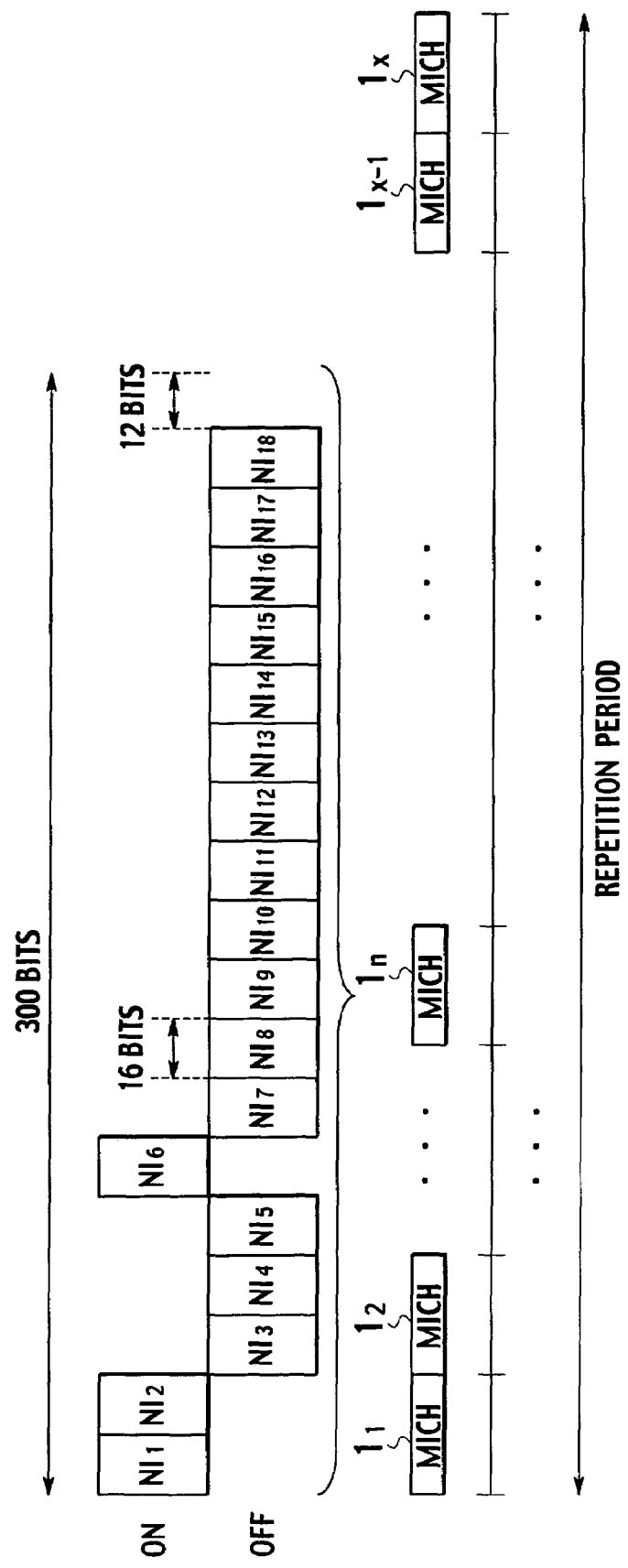
FIG. 4 is a diagram showing the MICH according to the embodiment of the present invention.

MICH 1 is described in detail using FIG. 4. The repetition period is divided into multiple reception timings at which respective mobile stations 10 receive the MICH 1. In other words, MICHs $1_1$, $1_2$, $1_n$, $1_{x-1}$, $1_x$ are transmitted to multiple mobile stations 10 during a repetition period. Each mobile station 10 receives the MICH transmitted at reception timing assigned for each mobile station 10. For example, the mobile station 10 with user ID '1' can receive the MICH $1_1$, and the mobile station 10 with user ID 'n' can receive the MICH $1_n$. The mobile station 10 can turn off the reception function at other reception timings than its own.

One frame of MICH is constituted by 300 bits. The first 288 bits are equally divided and used for transmitting NIs. The last 12 bits are not used. In FIG. 4, 288 bits are divided into 18 parts so as to transmit $NI_1$ through $NI_{18}$ in an $MICH1_n$. Length of an NI is 16 bits. The $NI_1$ through $NI_{18}$ are mapped onto respective MBMSs so as to instruct regarding the respective MBMSs. For example, $NI_1$ may be mapped onto 'MBMS#1', $NI_2$ onto 'MBMS#2', and $NI_6$ onto 'MBMS#6' so as to instruct regarding the respective MBMS#1, MBMS#2, and MBMS#6 by the $NI_1$, $NI_2$, and $NI_6$.

The mobile station 10 confirms the NI which instructs regarding the MBMS of interest to the mobile station 10. The mobile station 10 starts to receive the MCCH when the NI is on. For example, since the $NI_1$, $NI_2$, and $NI_6$ are on, the mobile station 10 receiving the MICH In starts to receive the MCCH when it is interested in the MBMS#1, MBMS#2, and MBMS#6 instructed by the NI$_1$, NI$_2$, and NI$_6$. The NIs are turned on when, for example, starting transmission of multimedia contents through an MBMS, changing a transmission method or contents, ending transmission, and the like. Note that the instruction data transmitted through the MICH 1 is also not changed during the modification period. In other words, the same MICH1 is repeatedly transmitted several times. As a result, the mobile station 10 can receive the instruction data without fail.

The notification equipment 60 and the mobile stations 10 are described in detail forthwith. As shown in FIG. 2, the notification equipment 60 comprises a transmission data determination unit 61, an instruction data generator 62, and an instruction data transmitter 63.

The transmission data determination unit 61 determines whether transmission data to be transmitted to a terminal equipment is first transmission data or repeated transmission data. The transmission data determination unit 61 determines control data to be transmitted to the mobile station 10 as transmission data to be transmitted to the terminal equipment. The transmission data determination unit 61 acquires transmission data (control data). For example, in the case where the notification equipment 60 is provided in a base station 20 or the radio network controller 30, the transmission data determination unit 61 acquires transmission data, which has come from the core network 40 or the radio network controller 30 and has been received by a network interface of the radio network controller 30 or the base station 20, from the network interface.

The transmission data determination unit 61 determines first transmission data or repeated transmission data by counting the number of times of transmission of transmission data. For example, the transmission data determination unit 61 determines that the transmission data is first transmission data when there is no received transmission data up to this point and the number of times of transmission is zero. On the other hand, the transmission data determination unit 61 determines that the transmission data is repeated transmission data when the number of times of transmission of the received transmission data is more than once. The transmission data determination unit 61 adds '1' to the number of times of transmission of that transmission data at the time of determination.

Alternatively, the transmission data determination unit 61 may determine first transmission data or repeated transmission data based on information from an upper level equipment. For example, in the case where the notification equipment 60 is provided in the base stations 20, the transmission data determination unit 61 acquires information indicating that transmission data is first transmission data or repeated transmission data with the transmission data from the contents server 50, the equipment in the core network 40, or the radio network controller 30. The transmission data determination unit 61 inputs a transmission data determination result into the instruction data generator 62.

The instruction data generator 62 generates identification instruction data indicating that transmission data is first transmission data or repeated transmission data based on the transmission data determination result by the transmission data determination unit 61. The instruction data generator 62 can generate the identification instruction data to be transmitted on the MICH, which is an instruction channel.

More specifically, the instruction data generator 62 generates an NI indicating that transmission data is first transmission data or repeated transmission data as identification instruction data. Hereafter, this NI is referred to as an 'identification NI' to distinguish from the regular NI. The identification NI is transmitted through the MICH. The instruction data generator 62 generates the MICH by mapping the generated identification NI onto the MICH.

Figure 5:
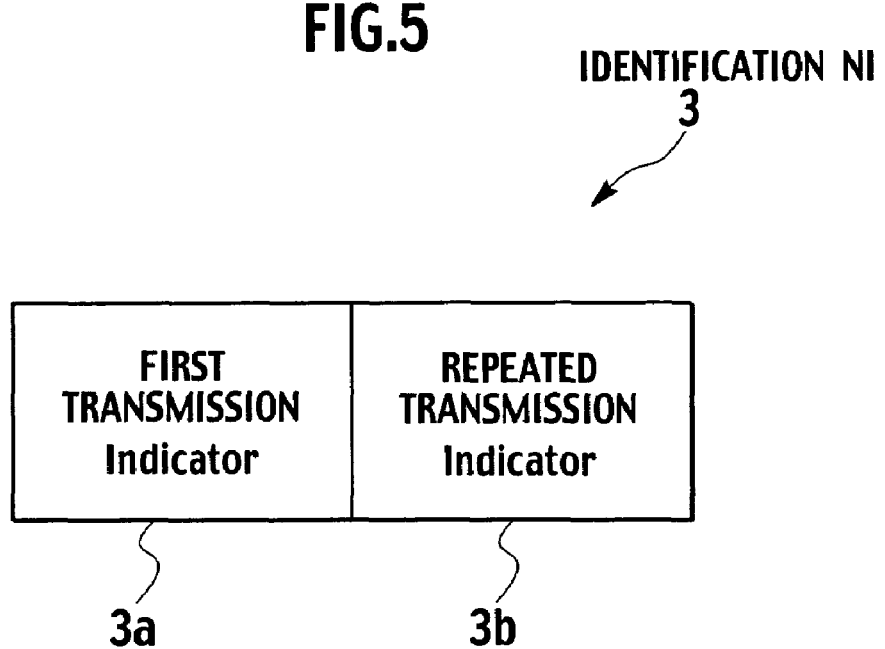
FIG. 5 is a diagram showing an identification NI according to the embodiment of the present invention.

For example, the instruction data generator 62 can generate an identification NI 3 shown in FIG. 5. The identification NI 3 includes a first transmission indicator 3*a* and a repeated transmission indicator 3*b*. The first transmission indicator 3*a* is a region indicating that transmission data is first transmission data, and the repeated transmission indicator 3*b* is a region indicating that transmission data is repeated transmission data. In this manner, the identification NI can be generated by dividing an NI into two regions and assigning respective regions to the first transmission indicator 3*a* and the repeated transmission indicator 3*b*. In this case, an identification NI may be assigned to an MBMS.

The instruction data generator 62 turns on the first transmission indicator 3*a* when the transmission data determination result indicates that transmission data is first transmission data. Accordingly, the instruction data generator 62 can generate the identification NI 3 indicating that the transmission data is first transmission data. The instruction data generator 62 turns on the repeated transmission indicator 3*b* when the transmission data determination result indicates transmission data is repeated transmission data. Accordingly, the instruction data generator 62 can generate the identification NI 3 indicating that the transmission data is repeated transmission data.

Alternatively, the instruction data generator 62 may generate the NI 3 indicating that transmission data is first transmission data by setting a flag to the first transmission indicator 3*a*, or may generate the NI 3 indicating that transmission data is repeated transmission data by setting a flag to the repeated transmission indicator 3*b*.

The first transmission indicator 3*a* and the repeated transmission indicator 3*b* may have equal or differing lengths. For example, the instruction data generator 62 may allow the first transmission indicator 3*a* to have 12 bits, the repeated transmission indicator 3*b* to have 4 bits, and powers used for transmitting respective indicators to have differing values. The instruction data generator 62 inputs the generated identification NI 3 into the instruction data transmitter 63.

Figure 6:
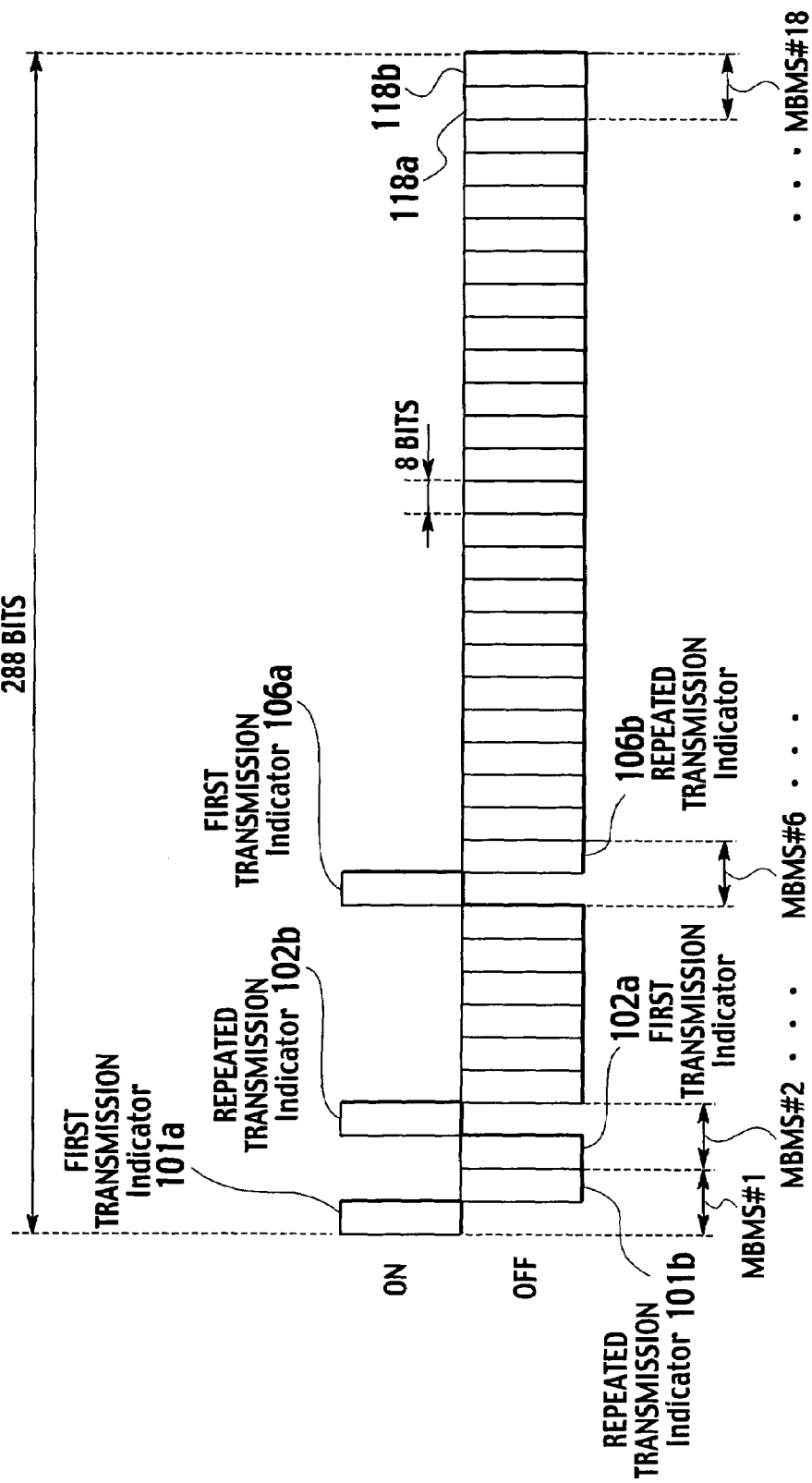
FIG. 6 is a diagram showing an MICH in the case of using a first transmission indicator and a repeated transmission indicator according to the embodiment of the present invention.

FIG. 6 shows a part of the MICH for transmitting identification NIs in the case of using the identification NI shown in FIG. 5. In FIG. 6, an identification NI having 16 bits is equally divided into first transmission indicators and repeated transmission indicators, which have 8 bits, respectively. A first transmission indicator 101*a* and a repeated transmission indicator 101*b* are assigned to the MBMS#1, a first transmission indicator 102*a* and a repeated transmission indicator 102*b* are assigned to the MBMS#2, and a first transmission indicator 106*a* and a repeated transmission indicator 106*b* are assigned to the MBMS#6. First transmission indicators and repeated transmission indicators are assigned to remaining MBMSs in order. Then the last first transmission indicator 118*a* and repeated transmission indicator 118*b* are assigned to the MBMS#18.

Since the first transmission indicators 101*a* and 106*a* are on and the repeated transmission indicators 101*b* and 106*b* are off in FIG. 6, control data regarding the MBMS#1 and MBMS#6 to be transmitted through the MCCH is first transmission data. On the other hand, since the first transmission indicator 102*a* is off and the repeated transmission indicator 102*b* is on, control data regarding the MBMS#2 to be transmitted through the MCCH is repeated transmission data. Note that as with the MBMS#18, when both the first transmission indicator 118*a* and the repeated transmission indicator 118*b* are off, it indicates that control data regarding that MBMS is not currently being transmitted through the MCCH.

Alternatively, the instruction data generator 62 may generate the identification NI by assigning an NI to a first transmission identification NI indicating that transmission data is first transmission data, and assigning a different NI from the first transmission identification NI to a repeated transmission identification NI indicating that transmission data is repeated transmission data. In this case, two identification NIs may be assigned to an MBMS in pairs.

Figure 7:
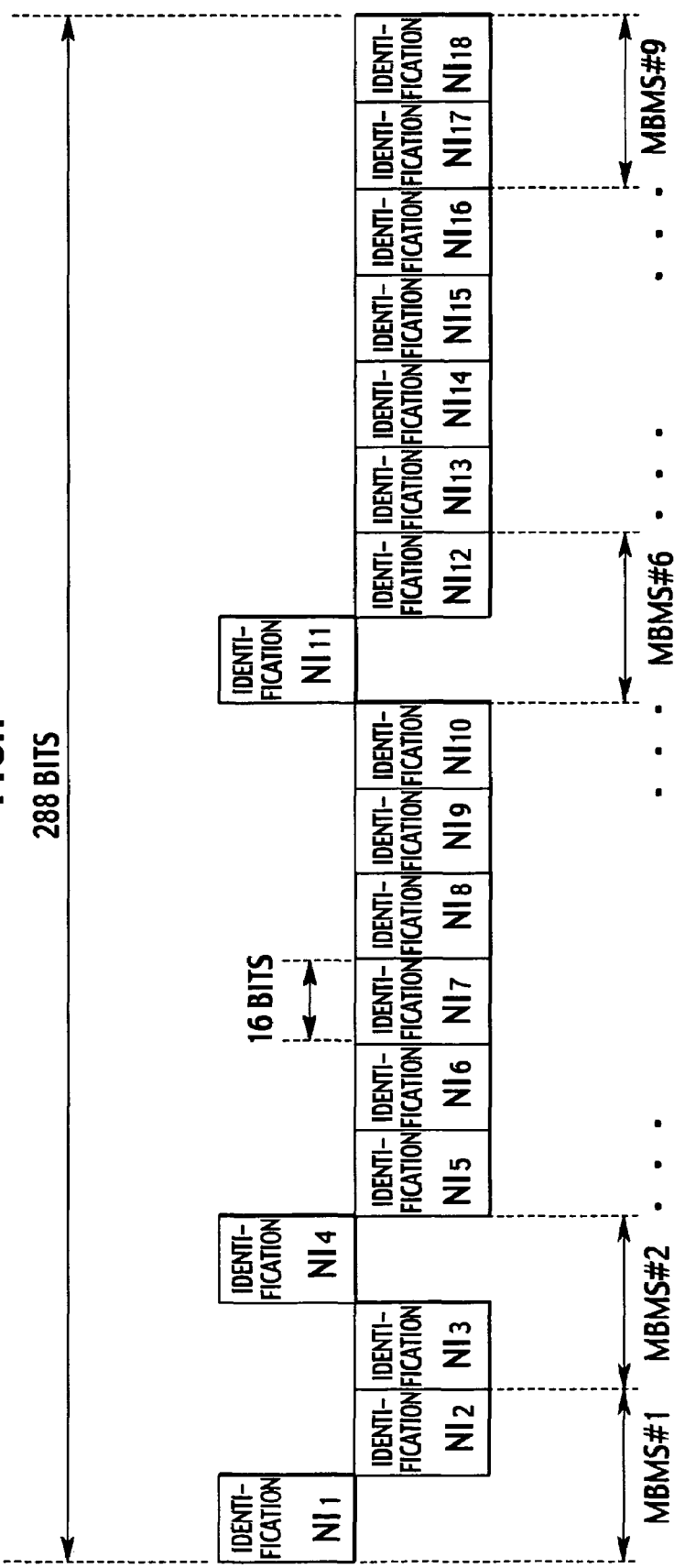
FIG. 7 is a diagram showing an MICH in the case of using a first transmission identification NI and a repeated transmission identification NI according to the embodiment of the present invention.

FIG. 7 shows a part of the MICH for transmitting identification NIs in the case of using two identification NIs in pairs. In FIG. 7, two consecutive identification NIs are used in pairs. A first transmission identification $NI_1$ and a repeated transmission identification $NI_2$ are assigned to the MBMS#1, a first transmission identification $NI_3$ and a repeated transmission identification $NI_4$ are assigned to the MBMS#2, and a first transmission identification $NI_{11}$ and a repeated transmission identification $NI_{12}$ are assigned to the MBMS#6. First transmission identification NIs and repeated transmission identification NIs are assigned to remaining MBMSs in order. Then the last first transmission identification $NI_{17}$ and repeated transmission identification $NI_{18}$ are assigned to the MBMS#9.

Since the first transmission identification $NI_1$ and first transmission identification $NI_{11}$ are on and the repeated transmission identification $NI_2$ and identification $NI_{12}$ are off in FIG. 7, control data regarding the MBMS#1 and MBMS#6 to be transmitted through the MCCH is first transmission data. On the other hand, since the first transmission identification $NI_3$ is off and the repeated transmission identification $NI_4$ is on, control data regarding the MBMS#2 transmitted through the MCCH is repeated transmission data. Note that as with the MBMS#9, when both the first transmission identification $NI_{17}$ and the repeated transmission identification $NI_{18}$ are off, it indicates that control data regarding that MBMS is not currently being transmitted on the MCCH.

According to these identification NIs, the transmission data is identifiable as first transmission data or repeated transmission data. In contrast, with the regular NI shown in FIG. 4, the $NI_1$, $NI_2$, and $NI_6$ corresponding to the MBMS#1, MBMS#2, and MBMS#6 are all on, thereby not allowing identification of whether the transmission data is first transmission data or repeated transmission data.

The instruction data transmitter 63 transmits the identification instruction data to the terminal equipments. The instruction data transmitter 63 transmits the identification NI 3 to the mobile stations 10. In the case where the notification equipment 60 is provided in the base stations 20, the instruction data transmitter 63 transmits the identification NI 3 to the mobile stations 10 through the MICH. In the case where the notification equipment 60 is provided in the radio network controller 30, an equipment in the core network 40, or the contents server 50, the instruction data transmitter 63 transmits the identification NI 3 to the mobile stations 10 via base stations 20 through the MICH. The instruction data transmitter 63 repeatedly transmits the identification NI 3 during a modification period.

Figure 8:
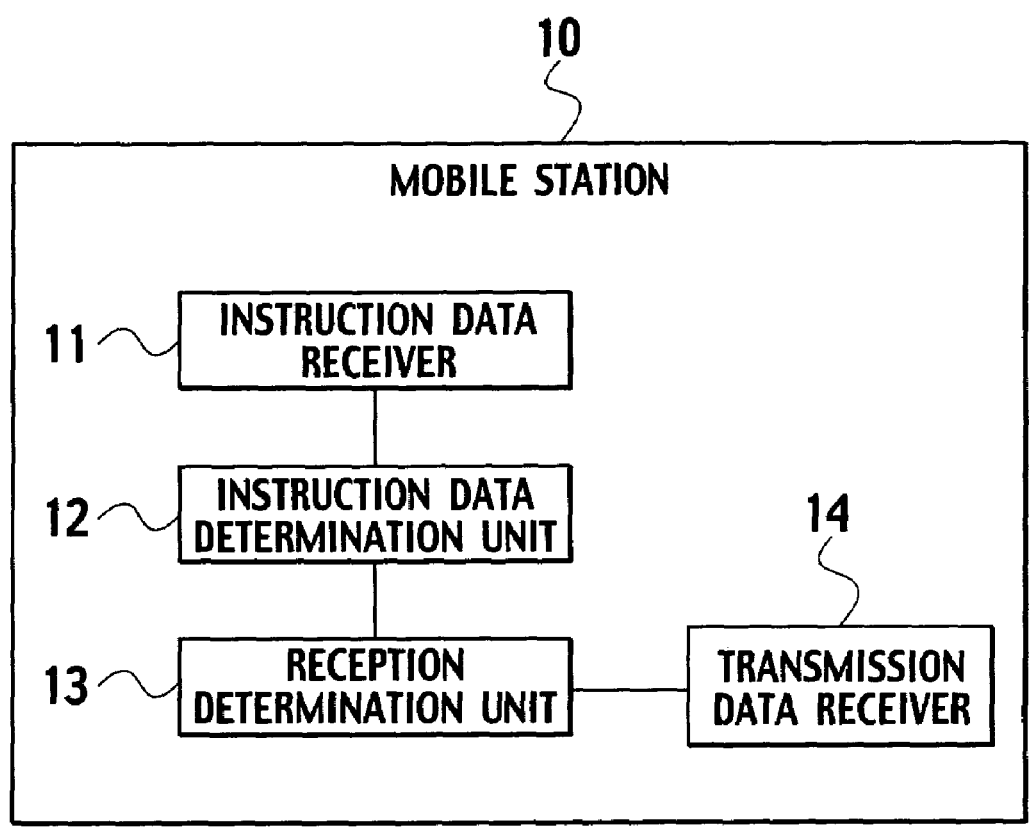
FIG. 8 is a block diagram showing a mobile station according to the embodiment of the present invention.

As shown in FIG. 8, the mobile station 10 comprises an instruction data receiver 11, an instruction data determination unit 12, a reception determination unit 13, and a transmission data receiver 14. The instruction data receiver 11 receives identification instruction data indicating that transmission data is first transmission data or repeated transmission data. The instruction data receiver 11 receives the identification NI 3 through the MICH. The instruction data receiver 11 receives an identification NI 3 regarding the MBMS, which is of interest to the mobile station 10. The instruction data receiver 11 inputs the received identification NI 3 into the instruction data determination unit 12.

The instruction data determination unit 12 determines whether transmission data is first transmission data or repeated transmission data based on identification instruction data. The instruction data determination unit 12 determines based on an identification NI 3. It is preferable that the instruction data determination unit 12 determines whether transmission data is first transmission data or repeated transmission data based on multiple pieces of identification NIs 3. In this case, the instruction data receiver 11 receives two times or more the identification NI 3 that is repeatedly transmitted during a modification period.

More specifically, in the case of determining based on an identification NI 3, the instruction data determination unit 12 determines that transmission data is first transmission data when the identification NI 3 indicates that the transmission data is first transmission data. On the hand, it determines that transmission data is repeated transmission data when the identification NI 3 indicates that the transmission data is repeated transmission data.

The instruction data determination unit 12 determines in the following manner in the case of determining based on multiple identification NIs 3. When both consecutively received identification NIs 3 indicate that transmission data is first transmission data, the instruction data determination unit 12 may determine that the transmission data is first transmission data. When both consecutively received identification NIs 3 indicate that transmission data is repeated transmission data, the instruction data determination unit 12 may determine that the transmission data is repeated transmission data.

Alternatively, when the identification NI 3 indicates that transmission data is first transmission data, the instruction data determination unit 12 determines that the transmission data is first transmission data. And when the identification NI 3 indicates that transmission data is repeated transmission data, the instruction data determination unit 12 may confirm the next received identification NI 3. In this case, the instruction data determination unit 12 determines that the transmission data is repeated transmission data when the next received identification NI 3 also indicates that the transmission data is repeated transmission data. On the other hand, the instruction data determination unit 12 determines that the transmission data is first transmission data when the next received identification NI 3 indicates that the transmission data is first transmission data. Note that when the next received identification NI 3 indicates that the transmission data is first transmission data, the instruction data determination unit 12 may confirm after the next received identification NI 3 and determine that the transmission data is first transmission data when after the next received identification NI 3 indicates that the transmission data is first transmission data.

Furthermore, the instruction data determination unit 12 may combine multiple identification NIs 3 by maximal ratio combining or selection combining and determine whether the combined identification NI indicates that transmission data is first transmission data or repeated transmission data. The instruction data determination unit 12 inputs an instruction data determination result into the reception determination unit 13.

The reception determination unit 13 determines whether or not to receive transmission data based on the instruction data determination result by the instruction data determination unit 12. It is preferable that the reception determination unit 13 determines whether or not to receive transmission data based on a transmission data reception result by the transmission data receiver 14 in addition to the instruction data determination result. The reception determination unit 13 acquires the reception result from the transmission data receiver 14.

In the case of determining based on the instruction data determination result, the reception determination unit 13 determines to receive transmission data, which is control data to be transmitted on the MCCH, when for example, the instruction data determination result is that the transmission data is first transmission data. On the other hand, the reception determination unit 13 determines not to receive transmission data when the instruction data determination result is that the transmission data is repeated transmission data.

Even in the case of determining based on the instruction data determination result and the reception result, the reception determination unit 13 determines to receive transmission data when the instruction data determination result is that the transmission data is first transmission data. On the other hand, the reception determination unit 13 determines whether or not the transmission data has already been successfully received based on the reception result when the instruction data determination result is that the transmission data is repeated transmission data. For example, the reception determination unit 13 determines whether or not the control data repeatedly transmitted on the MCCH has already been successfully received. The reception determination unit 13 determines not to receive the transmission data when reception of the transmission data has been succeeded. On the other hand, the reception determination unit 13 determines to receive the transmission data when reception of the transmission data has not been succeeded. The reception determination unit 13 inputs the reception determination result into the transmission data receiver 14.

The transmission data receiver 14 receives transmission data based on the reception determination result by the reception determination unit 13. The transmission data receiver 14 receives the control data transmitted through the MCCH as transmission data when the reception determination result indicates receiving the transmission data. On the other hand, the transmission data receiver 14 does not receive the control data when the reception determination result indicates not receiving the transmission data. At this time, the transmission data receiver 14 may turn off the receiving function. In addition, the transmission data receiver 14 inputs the transmission data reception result into the reception determination unit 13.

(Communication Method)

Figure 9:
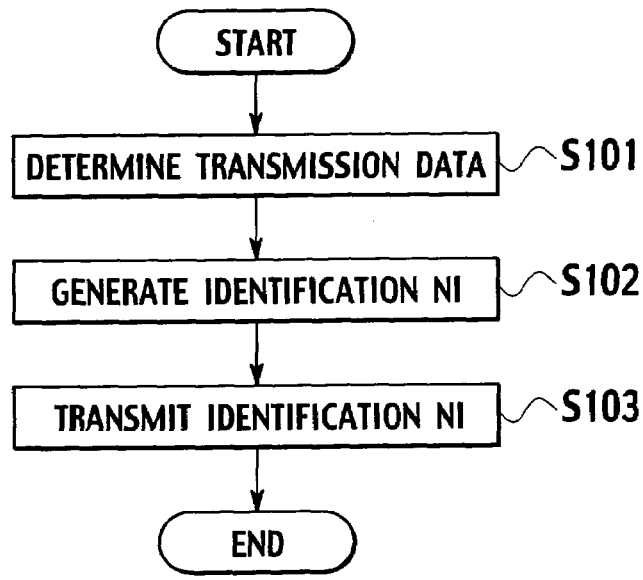
FIG. 9 is a flowchart showing a notification procedure according to a communication method of the embodiment of the present invention.

Next, a procedure of a communication method using the mobile communication system 100 is described. FIG. 9 shows a notification procedure. The notification equipment 60 determines whether transmission data such as control data to be transmitted to a mobile station 10 is first transmission data or repeated transmission data (S101). The notification equipment 60 generates an identification NI indicating that the transmission data is first transmission data or repeated transmission data based on the transmission data determination result (S102). The notification equipment 60 then transmits the generated identification NI to the mobile station 10 (S103).

Figure 10:
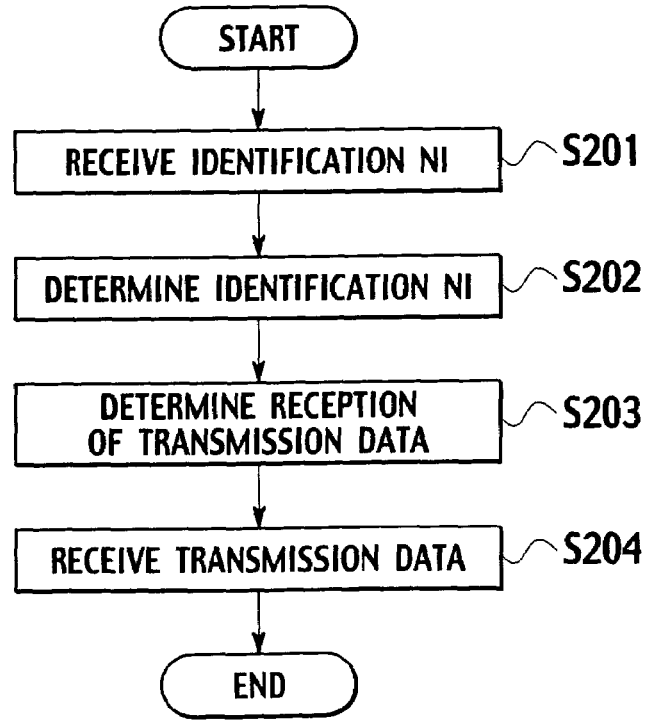
FIG. 10 is a flowchart showing a reception procedure according to the communication method of the embodiment of the present invention.

FIG. 10 shows a reception procedure. The mobile station 10 receives the identification NI from the notification equipment 60 (S201). The mobile station 10 determines whether transmission data is first transmission data or repeated transmission data based on the received identification NI (S202). The mobile station 10 determines whether or not to receive the transmission data based on the instruction data determination result and reception result. The mobile station 10 receives the transmission data based on the reception determination result (S204).

According to such mobile communication system 100, notification equipment 60, mobile station 10, and communication method, the notification equipment 60 can determine whether transmission data such as control data is first transmission data, which is to be transmitted for the first time, or repeated transmission data, which has already been transmitted once and will be further repeatedly transmitted, and then generate an identification NI indicating that the transmission data is first transmission data or repeated transmission data. The notification equipment 60 can then notify the mobile station 10 that the transmission data is first transmission data or repeated transmission data by transmitting that identification NI to the mobile station 10. Accordingly, the notification equipment 60 can make the mobile station 10 properly receive only the necessary transmission data.

Furthermore, the notification equipment 60 may generate an identification NI to be transmitted on the MICH for transmitting an NI regarding broadcast or multicast. Accordingly, the notification equipment 60 can transmit an identification NI to the mobile station 10 through an existing MICH.

In addition, the mobile station 10 can receive the identification NI and determine that the transmission data is first transmission data or repeated transmission data. The mobile station 10 can determine whether or not to receive the transmission data based on the instruction data determination result and then receive the transmission data such as control data. Accordingly, the mobile station 10 can properly receive only the necessary transmission data.

Furthermore, the mobile station 10 can determine whether or not to receive the transmission data based on the instruction data determination result and the transmission data reception result by the transmission data receiver 14. Therefore, the mobile station 10 can more properly receive only the necessary transmission data in consideration of the reception result of past transmission data in addition to the instruction data determination result.

Furthermore, the mobile station 10 can determine whether the transmission data is first transmission data or repeated transmission data based on multiple pieces of identification NI. Therefore, the mobile station 10 can prevent erroneous determination, and more accurately determine that transmission data is first transmission data or repeated transmission data. Accordingly, the mobile station 10 can more properly receive the necessary transmission data.

In this manner, according to the mobile communication system 100, when broadcasting or multicasting, information of whether transmission data is first transmission data or repeated transmission data may be provided to the mobile station 10 using the identification NI. Therefore, the mobile station 10 can successfully receive only the necessary transmission data. As a result, the mobile station 10 can shorten the time for receiving useless transmission data, and thereby reducing draining of a battery in the mobile station 10. Furthermore, the mobile station 10 can also prevent increase in control load due to reception of useless transmission data.

Although the inventions have been described above by reference to certain embodiments of the inventions, the inventions are not limited to the embodiments described above. Modifications and variations of the embodiments described above will occur to those skilled in the art, in light of the above teachings. Transmission data to be transmitted to the terminal equipment is not limited. For example, multimedia contents to be broadcasted or multicasted to the terminal equipment may be used as the transmission data. In addition, the terminal equipment is also not limited to the mobile station 10. A personal computer or the like can be used as the terminal equipment.

What is claimed is:

1. A notification equipment used in a communication system in which a terminal equipment determines whether or not to receive control data via a control channel based on received identification instruction data, and receives multimedia contents based on the received control data comprising:
   an instruction data generator configured to generate the identification instruction data indicating that the control to be transmitted to the terminal equipment is the first control data or the repeated control data; and
   an instruction data transmitter configured to transmit an instruction channel frame to the terminal equipment via an instruction channel repeatedly during a predetermined period,
   wherein the instruction channel frame includes a plurality of identification instruction data, and
   each of the plurality of identification instruction data is set for each kind of multimedia contents.

2. The notification equipment of claim 1, wherein the instruction data generator generates the identification instruction data to be transmitted on an instruction channel for transmitting instruction data regarding broadcast or multicast.

3. A terminal equipment, comprising:
   an instruction data receiver configured to receive identification instruction data indicating that control data to be transmitted to the terminal equipment is the first control data or the repeated control data, via an instruction channel;
   an instruction data determination unit configured to determine whether the control data is the first control data or the repeated control data, based on the received identification instruction data;
   a reception determination unit configured to determine whether or not to receive the control data based on the determination result by the instruction data determination unit;
   a control data receiver configured to receive the control data via a control channel, based on the determination result by the reception determination unit; and
   a multimedia contents receiver configured to receive multimedia contents via a data channel, based on the received control data,
   wherein, via the instruction channel, an instruction channel frame including a plurality of identification instruction data is transmitted repeatedly during a predetermined period, and
   each of the plurality of identification instruction data is set for each kind of multimedia contents.

4. The terminal equipment of claim 3, wherein the reception determination unit determines whether or not to receive the control data based on the instruction data determination result and control data reception result by the control data receiver.

5. The terminal equipment of claim 3, wherein the instruction data determination unit determines whether the control data is the first control data or the repeated control data based on multiple pieces of the identification instruction data.

6. The terminal equipment according to claim 3, wherein the instruction data receiver is configured to receive the instruction channel frame, at a timing which is assigned to the terminal equipment.

7. A communication system comprising a notification equipment and terminal equipment, wherein
   the notification equipment comprises:
   an instruction data generator configured to generate an identification instruction data indicating that control data to be transmitted to the terminal equipment is the first control data or the repeated control data; and
   an instruction data transmitter configured to transmit an instruction channel frame to the terminal equipment via an instruction channel repeatedly during a predetermined period; and
   the terminal equipment comprises:
   an instruction data receiver configured to receive identification instruction data included in the instruction channel frame, via the instruction channel;
   an instruction data determination unit configured to determine whether the control data is the first control data or the repeated control data, based on the received identification instruction data;
   a reception determination unit configured to determine whether or not to receive the control data based on the determination result by the instruction data determination unit;
   a control data receiver configured to receive the control data via a control channel, based on the determination result by the reception determination unit; and
   a multimedia contents receiver configured to receive multimedia contents via a data channel, based on the received control data,
   wherein the instruction channel frame includes a plurality of identification instruction data, and
   each of the plurality of identification instruction data is set for each kind of multimedia contents.

8. A communication method comprising:
   generating, at a notification equipment, an identification instruction data indicating that control data to be transmitted to the terminal equipment is the first control data or the repeated control data;
   transmitting, at the notification equipment, an instruction channel frame to the terminal equipment via an instruction channel repeatedly during a predetermined period;
   receiving, at a terminal equipment, identification instruction data included in the instruction channel frame, via the instruction channel;
   determining, at the terminal equipment, whether or not to receive the control data or the repeated control data, based on whether the control data is the first control data or the repeated control data, based on the received identification instruction data;
   receiving, at the terminal equipment, the control data via a control channel, based on the determination result; and
   receiving, at the terminal equipment, multimedia contents via a data channel, based on the received control data,
   wherein the instruction channel frame includes a plurality of identification instruction data, and
   each of the plurality of identification instruction data is set for each kind of multimedia contents.

* * * * *